United States Patent

Deer

Patent Number: 5,090,131
Date of Patent: Feb. 25, 1992

[54] POSITION DETERMINING APPARATUS

[75] Inventor: Daniel J. Deer, Chepstow, United Kingdom

[73] Assignee: Renishaw plc, Gloucestershire, England

[21] Appl. No.: 623,457

[22] PCT Filed: Apr. 24, 1990

[86] PCT No.: PCT/GB90/00629

§ 371 Date: Dec. 5, 1990

§ 102(e) Date: Dec. 5, 1990

[87] PCT Pub. No.: WO90/12998

PCT Pub. Date: Nov. 1, 1990

[30] Foreign Application Priority Data

Apr. 25, 1989 [GB] United Kingdom ............. 8909357

[51] Int. Cl.$^5$ ........................... G01B 7/00; G01B 7/28
[52] U.S. Cl. ................................... 33/556; 33/558; 33/559; 33/561
[58] Field of Search ............... 33/556, 558, 559, 561, 33/503, 504

[56] References Cited

U.S. PATENT DOCUMENTS

| 4,364,180 | 12/1982 | Willhelm et al. | |
|---|---|---|---|
| 4,513,507 | 4/1985 | Laskowski | 33/556 |
| 4,550,418 | 10/1985 | Deis | 33/556 |
| 4,567,665 | 2/1986 | Ernst | 33/561 |
| 4,578,873 | 4/1986 | Klingler et al. | 33/556 |
| 4,769,919 | 9/1988 | Lloyd et al. | 33/558 |
| 4,815,214 | 3/1989 | Enderle et al. | 33/558 |
| 4,854,050 | 8/1989 | McMurtry | 33/558 |
| 4,897,929 | 2/1990 | Ernst et al. | 33/559 |
| 4,934,065 | 6/1990 | Hajdukiewicz | 33/561 |

FOREIGN PATENT DOCUMENTS

| 0068899 | 1/1983 | European Pat. Off. . |
| 0144624 | 6/1985 | European Pat. Off. . |
| 0243766 | 3/1988 | European Pat. Off. . |
| 2047133 | 11/1980 | United Kingdom . |
| 2049198 | 12/1980 | United Kingdom . |

Primary Examiner—William A. Cuchlinski, Jr.
Assistant Examiner—C. W. Fulton
Attorney, Agent, or Firm—Oliff & Berridge

[57] ABSTRACT

A measuring probe includes a fixed housing (2) and a movable stylus carrier (10) which is urged by a spring (18) into a rest position in a support (14). The support comprises six seating elements confronting corresponding seating elements (12) on the stylus carrier. Strain gauges (20) are provided on the seating elements of the supports (14) to measure the strain produced in the supports (14) by the movable member resting on them. Each strain gauge produces a signal from which any variation in strain, and hence any displacement of the movable member relative to the fixed member due to a change in forces between the two, can be determined by a computer.

12 Claims, 2 Drawing Sheets

POSITION DETERMINING APPARATUS

The present invention relates to position determining apparatus and has application, for example, in measuring probes.

Measuring probes are known, for example from UK Patent No. 1,455,977 in which a movable stylus carrier is supported on seats within the probe body in a rest position, when no force acts on the stylus. In a measuring operation the probe is moved by a machine until the stylus contacts a workpiece to be measured whereby a force is applied to the stylus causing the stylus to be displaced from the rest position by tilting or axial displacement.

It is important for accurate measurement of workpieces that the stylus carrier returns to its rest position with great precision after each displacement so that the stylus ball, which contacts the workpiece returns to the same position in space relative to the probe.

In a probe which uses a kinematic location for the stylus carrier the position to which the stylus carrier returns is influenced by friction at the seats. Thus the position of the stylus ball in space can vary after each displacement and the so-called rest position of the stylus may not be exactly the same prior to each measurement. A spring may be used to assist in overcoming the frictional forces at the seats, but this has been found not to completely solve the problem without unacceptably high spring forces.

A similar problem occurs in a variety of pieces of apparatus particularly in the measuring field where one member or part is to be repeatedly mounted on and removed from another part with great accuracy. Examples of such apparatus are robots; probe heads for mounting measuring probes, and in machine tools which carry probes for measuring workpieces.

This problem is solved in accordance with the invention in apparatus having a first member supported on a second member by determining in all directions the displacement of a part of the supported member which is caused by a change in the force applied by the supported member to a part of the support.

This is most conveniently done by measuring the forces on sufficient parts of the support or the supported member to enable the displacement of the supported member in all of the required directions to be determined.

In the case of a kinematically mounted stylus carrier in a measuring probe for example, in which six confronting support points are provided on each of the movable stylus carrier and the fixed structures, this can be achieved by determining the translational and rotational displacements about three orthogonal axes of each of the support points on the stylus carrier due to any change in the forces between the fixed and movable structures.

In preferred embodiments of the invention this determination is made by measuring variations in the forces on the fixed structure or the stylus carrier using strain measuring devices adjacent the support points thereon, although other methods are possible.

Examples of the invention will now be more particularly described with reference to the accompanying drawings in which.

Figure 1:
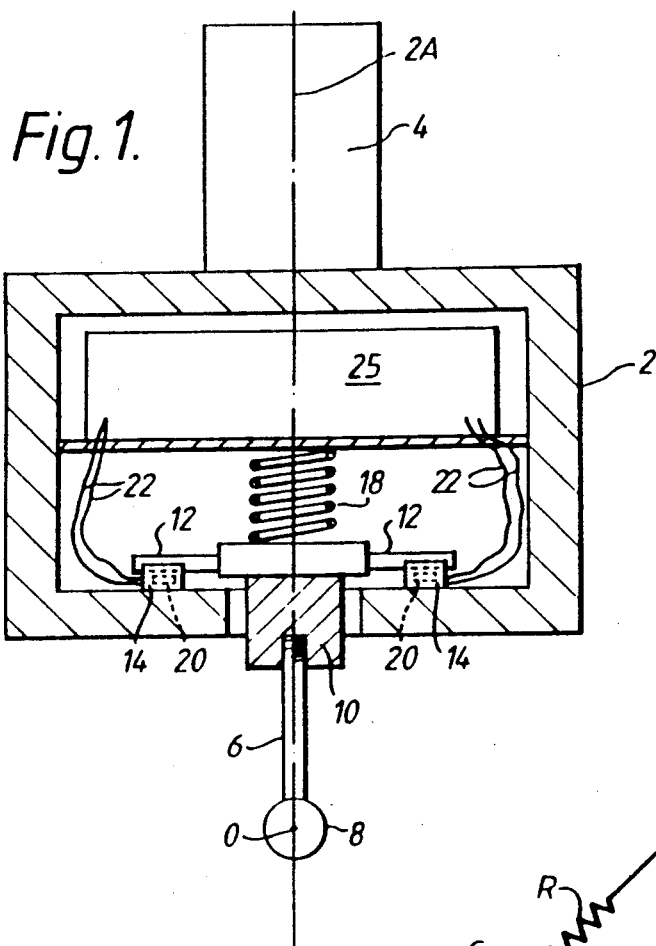
FIG. 1 is a sectional elevation of a probe according to the present invention.

Referring now to the drawings, a probe comprises a housing 2 which constitutes a fixed member of the probe. The housing has an axis 2A and which terminates in a shank 4 for connecting the probe to a machine (not shown). The machine may be a co-ordinate measuring machine or a machine tool. The probe includes a stylus 6 which terminates in a ball 8 for contacting a workpiece. The stylus 6 is connected to a stylus carrier 10 which includes seating elements 12. The stylus carrier constitutes a movable member of the probe. In this example the seating elements are in the form of three cylindrical rods spaced at 120° intervals around the axis 2A. The seating elements 12 are supported in confronting seats 14 each of which in this example consists of a pair of hollow wedge-shaped seating elements 16 (FIG. 2) fixed to the housing 2. The seating elements 12 are urged into contact with both wedge-shaped seating elements 16 of a seat 14 by bias means which as shown may be a spring 18. Because in this example three equiangular spaced seats are used they form a kinematic location for the stylus carrier 10. This seating arrangment provides a so-called positive rest position for the stylus when no external force acts on it. However, other seating arrangements may be used which are not necessarily kinematic, and the invention may be applied to them.

The stylus is capable of being displaced from its rest position by an external force acting on it, usually when the stylus ball 8 contacts a workpiece being measured. The displacement may be an axial or tilting movement which causes the seating elements 12 to be displaced from the seats 14. Upon cessation of the external force on the stylus the seating elements are returned to the seats 14 with the aid of the spring 18.

It has been found however, that friction at the surfaces of the seating elements 12 and 16 can cause slight variations in the relative positions of the seating elements 12 and 16 each time the stylus is displaced from and returned to the rest position. This slight variation in the relative position of the seating elements can cause a significant variation in the position in space of the centre 0 of the stylus ball 8 relative to the probe housing. This is particularly apparent when a long stylus is used with the probe.

Thus the so-called rest position of the stylus has been found not to be a fixed position relative to the housing but one which involves random slight variations because of the friction acting at the seating elements.

Any variation in the positions of the seating elements 12 relative to the confronting wedges 16 will cause variations in the loads applied to the six surfaces of the wedges 16, and this will result in variations in the strains produced in the structure of the wedges by the weight of the stylus carrier and the pressure of the spring 18.

The invention provides measuring devices for example strain gauges 20 suitably positioned on the wedges 16 to measure the strain in the wedge structure, whereby any variations in strain may be detected. The electrical output of the strain gauges 20 is taken to an electrical circuit 25 within the probe by leads 22.

By calibrating the position of the stylus ball in space relative to the probe against the strain detected at the seats, the error in the position of the centre of the ball in the so-called rest position at each re-seating of the stylus carrier, can be determined and allowed for in the next measurement. Thus the accuracy of the probe measurements can be improved.

Figure 3:
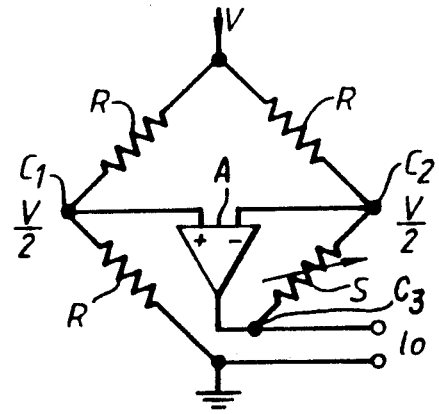
FIG. 3 is an electrical circuit for producing an electrical signal from the strain measuring devices.

FIG. 3 illustrates an electrical circuit 25 which produces an output which varies linearly with the strain gauge output. The circuit consists of a bridge circuit having three resistors R of equal value and a strain gauge S the resistance X of which is variable. The two mid-point connections of the bridge C1 and C2 are connected to an operational amplifier A the output of which is connected to the other side C3 of the strain gauge S.

Assuming a voltage V is connected at one side of the bridge circuit and the other side is earthed, the voltage at the mid-point connections C1 and C2 will be V/2. The operational amplifier is designed to produce an output at C3 which maintains the value of the voltage at C2 at the value V/2 as the resistance X of the strain gauge S varies.

The output $e_o$ from the bridge can be shown to be $e_o = V/2X$.

Figure 4:
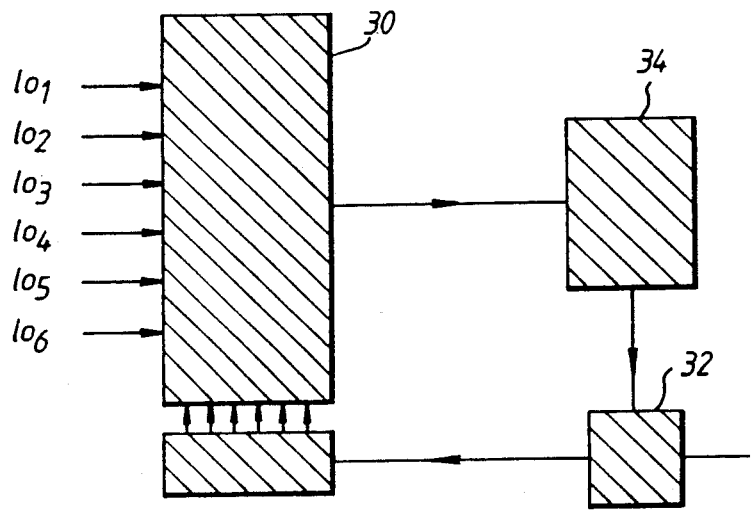
FIG. 4 is a diagrammatic illustration of the electronics required for the analysis of the signals from the strain measuring devices.

As shown in FIG. 4 the six outputs from the bridge are each fed to a multiplexing unit 30 and are sequentially read under the control of a computer 32. The output from the multiplexing unit 30 is fed to an analogue to digital converter 34 and from there passes to the computer 32.

The computer is programmed to handle the information from the strain gauges in various ways depending on the information required from the probe.

First of all the computer compares each reading as it comes from the multiplexing unit with a reference value to determine which of the readings have changed since the last reading, and the value of the change. The change in each reading is directly proportional to the increase or decrease in the strain at each of the six seating elements 16. The computer thus calculates the new strain value from which the new positions of the rollers 12 can be determined. This in turn enables the location of the centre of the stylus ball relative to the probe to be calculated and this information is continuously used to update the software in the machine which is used for calculating the measurements of the workpiece.

The method of calculation is briefly as follows:

Considering the mid-point of the centre assembly it will undergo a rotation and a translation as any one of the rollers is moved due to a change in force at the support.

Figure 7A:
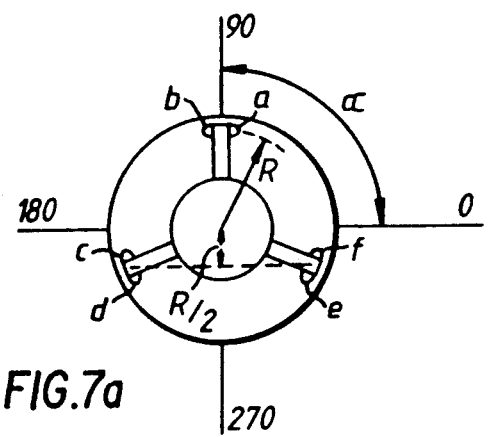
FIGS. 7, 7a and 7b show the nomenclature for the calculations required by the computer.
Figure 7:
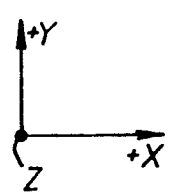
Figure 7B:
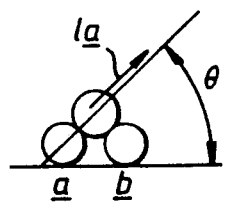

Referring now to FIGS. 7, 7a and 7b:
the six balls are identified at a b c d e and f,
the distance of the centre of the centre assembly from each ball is R,
the three coordinate axes of the centre assembly are x, y and z,
the angular position of any ball e.g ball a is $\alpha a$,
the contact angle between the balls and rollers is $\theta$ and,
the displacement of the roller due to change of force at any ball e.g. a is $1a$, the measurement of which is determined from the strain gauge signals.

With this notation it can be shown that taking one ball a the movement dr of a roller in the x or y directions due a movement $1a$ is given by $$dr(z) = 1a \sin \theta$$

$$dr(x,y) = 1a \cos \theta$$

Considering the situation when ball a is the only one with a change in force and therefore $1b = 1c = 1d = 1e = 1f = 0$ the incremental translations of the centre of the centre assembly in each of the three coordinate directions x, y and z due to a movement $1a$ of roller a are given by:

$$dx = \frac{-1a \cos \theta \sin \alpha a}{3}$$

$$dy = \frac{1a \cos \theta \cos \alpha a}{3}$$

$$dz = \frac{1a \sin \theta}{3}$$

the incremental rotations of the centre of the centre assembly abut the axes x, y and z are given by:

$$\beta x = \tan^{-1} \frac{(2 1a \sin \Theta)}{3R} \sin \alpha a$$

$$\beta y = \tan^{-1} \frac{(2 1a \sin \Theta)}{3R} \cos \alpha a$$

$$\beta z = \tan^{-1} \frac{(2 1a \cos \Theta)}{3R}$$

The resultant movement of the centre of the centre assembly when movements $1b$ $1c$ $1d$ $1e$ and $1f$ are taken into account will be the sum of six increments of translation and rotation for all six balls.

These movements can then be used in combination with details of the stylus, for example, length and orientation, to calculate the changes in position of the stylus ball.

To increase the speed at which the computer can update the machine software, a pre-programmed look-up table may be provided in the memory of the computer 32 which contains information relating to the positions of the centre of the stylus ball relative to the probe for a large number of combinations of readings of strain from the six seats. A different look-up table will be needed for each new length of stylus provided on the probe.

To take account of temperature changes affecting the strain measurement, the strain gauges can be zeroed at appropriate intervals by driving the probe into a workpiece in a direction such as to lift the seating elements 12 out of the seats 14. In this condition the readings of all of the strain gauges should be the same since there is no force on the seats 14. These readings are taken to be the zero readings.

After the seating elements 12 have been allowed to re-seat, the readings on the strain gauges will clearly change, and from the differences in the readings of the strain gauges it is possible to calculate where the centre of the ball should be. By subsequently measuring the actual position of the stylus ball relative to the probe, allowance can be made for any deformation of the stylus. This measurement can be carried out by a standard datuming routine, provided that the assumed position of the stylus ball is re-calculated before each contact between the stylus ball and a datum artefact, and any change in position allowed for in the datuming calculations.

It can be seen that the invention provides a method of continuously updating the knowledge in the machine computer of the position of the centre of the stylus ball relative to the probe. The method therefore automatically eliminates hysteresis errors due to unequal forces being generated at the seating elements 16. The computer can also be programmed to send a signal to the machine that the next reading will be in error, if it detects from the strain gauges that the stylus carrier has failed to re-seat.

The probe may use any form of signalling means to provide a signal to the machine indicating that the stylus has contacted a workpiece. For example, the probe may include a piezo-electric element which detects the shockwave generated in the stylus at the instant of contact, strain gauges for detecting strain on various elements of the probe fixed or moving parts, or optical, pneumatic or electrical switches to detect displacement of the seating elements 12 from the seats 14. Alternatively the contact of the stylus with the workpiece may be used to complete an electrical circuit through the probe to the machine. These and other methods of generating the required signal for making measurements and to stop the machine are known and are not described in detail.

If desired, however, in place of, or in addition, to any of the signalling means referred to above, the computer can also be programmed to send a trigger signal to the machine when the strain gauges indicate that a force on the stylus ball has caused the stylus carrier to lift off one of the seats, or that the strain on a pair of seats has decreased to a level such that lift off is imminent. For this the computer needs to be programmed simply to add together the signals from the two adjacent seating elements 16 forming a seat, and compare the total strain at each seat with a pre-programmed threshold for the respective seat, and produce a signal when the threshold is reached.

Because the invention enables the positions of the seating elements 12 to be accurately and continuously monitored, the need for accuracy in the formation of the seats is reduced. For example, it is no longer necessary to use a three point kinematic location which has hitherto been required for accurate re-positioning of the probe stylus. Depending on the capacity of the computer, more seating positions may be introduced to reduce the lobing characteristic of the three point location system, i.e. that characteristic produced by the fact that different forces are required to cause displacement of the stylus depending on the direction of the force on the stylus.

Another example of the use of the invention in a probe application is in a probe in which the stylus is removable to be replaced by a different type. In such probes means are provided for clamping and unclamping the various styli but it is important to know that each one is clamped correctly into its rest position.

The invention is of particular use for a probe which is mounted on the end of a horizontal arm of a machine where the effect of gravity will affect the rest position of the styli.

The strain gauges have been shown positioned on the underside of the seating surfaces. However the positions and numbers of the strain gauges is a matter of experiment and choice in order to provide the optimum response. For example, they may be positioned on top surfaces of seating elements 16 or on the rods 12 in positions where the load on the stylus carrier acts directly through the strain gauge. Any inaccuracy which might result in the position of the rods 12 because of the flexibility of the strain gauges will be automatically compensated for by the ability of the computer to calculate their positions continuously.

Figure 2:
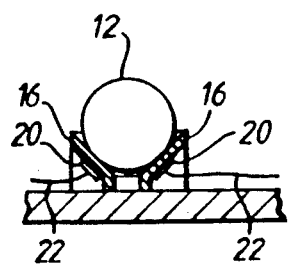
FIG. 2 is an enlarged view of one of the supports for the stylus carrier within the probe of FIG. 1 and showing the strain measuring devices.
Figure 5A:
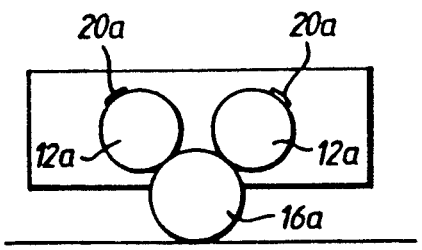
FIGS. 5a and 5b are respectively an end elevation and cross-section of an alternative support arrangement for the stylus holder of a measuring probe.
Figure 5B:
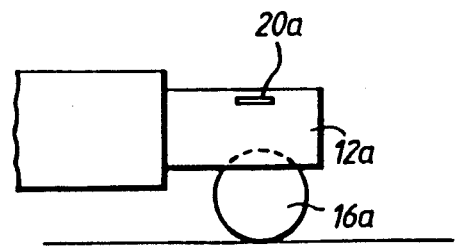
Figure 6A:
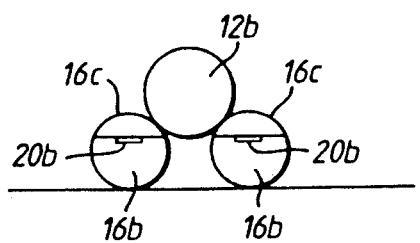
FIGS. 6a and 6b are respectively an end elevation and cross-section of a further alternative support arrangement for the stylus holder of a measuring probe.
Figure 6B:
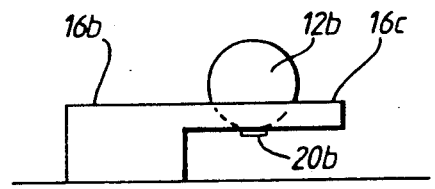

FIGS. 5a, 5b, 6a and 6b show two alternative positions for the strain measuring devices. In FIG. 5a the seat elements 16 of FIG. 2 are replaced by a single ball 16a, and the single rod 12 forming the seat element on the stylus carrier 10 is replaced by a pair of rods 12a. Strain gauges 20a are placed on each of the rods at positions diametrically opposite to the contact point between the rods and balls. In FIG. 6a the seat elements 16 of FIG. 2 are replaced by rods 16b which are partly cut away to leave a cantilevered section (16c) on which the strain gauges 20b are positioned, and the rod 12 is replaced by a ball 12b which rests on the rods 16b.

The term strain gauge as used throughout should be interpreted to mean any suitable form of strain measuring device that can detect the deformation of the support elements. Examples of such known devices, are resistance strain gauges, piezo resistive devices photo elastic devices and load cells. However, since deformation of the support will inevitably involve a movement or displacement of both the supporting end members, a sensitive optical displacement measuring system may be carried by either of the members to determine the displacement directly.

The invention is not limited to the determination of the position of a stylus in a probe as described above. For example the invention may be applied to robots where it is important to know that the relative positions of parts of the robot arms are accurately repeated during a sequence of movements. Also in a co-ordinate measuring machine or machine tool a probe may be mounted on an indexable head in which case it is important to know that each time the head is moved to one of its predetermined positions, it achieves the position accurately, or if it does not achieve the position, by how much its position varies from the desired position.

By measuring the strains on the supports supporting relatively movable parts of any apparatus, including robots, probe heads machine tools or measuring machines, the relative positions of the two parts can be calculated after each movement.

I claim:

1. Apparatus including a movable member supported on a fixed member for movement into and out of a rest position defined by support means on said fixed member, said support means including first seating elements which are arranged to confront corresponding second seating elements provided on the movable member, characterized by measuring devices positioned on at least one of said first and second seating elements, each measuring device being capable of providing a signal indicative of the strain on its respective seating elements, and means for determining from said signals the displacements in all directions of the moveable member caused by a change in the force applied by the movable member to the fixed member.

2. Apparatus as claimed in claim 1 wherein the measuring devices are provided on each of said first seating elements of the fixed member.

3. Apparatus as claimed in claim 1 wherein the measuring devices are provided on each of said second seating elements of the movable member.

4. Apparatus as claimed in claim 1 wherein the apparatus is a probe having a movable stylus supported on fixed structure, the fixed structure having six first seating elements upon which the stylus is supported, and the measuring devices are attached to each of said first seating elements on the fixed structure.

5. Apparatus as claimed in claim 1 wherein the measuring devices are strain measuring devices.

6. Apparatus as claimed in claim 1 wherein the strain measuring devices are resistance strain gauges.

7. Apparatus as claimed in claim 5 wherein the strain measuring devices are piezo-resistive devices.

8. Apparatus as claimed claim 5 wherein the strain measuring devices are load cells.

9. Apparatus as claimed in claim 5 wherein the strain measuring devices are photo elastic devices.

10. Apparatus as claimed in claim 1 wherein the seating elements on the fixed member are hollow wedge-shaped elements and a strain measuring device is provided on an inside surface of each of said first seating elements.

11. Apparatus as claimed in claim 1 wherein the first seating elements on the fixed member are spherical elements, the confronting second seating elements on the movable member are cylindrical rods and at least one strain measuring device is provided on each rod.

12. Apparatus as claimed in claim 1 wherein the first seating elements on the fixed member are formed by a pair of cylindrical rods, the confronting seating second elements on the movable member are formed by single spherical elements, the rods are cut away to form a cantilevered section on which the spherical elements of the movable member are supported, and a strain measuring device is provided on the cantilevered section of each of the rods.

* * * * *